US010576855B2

(12) United States Patent
Dörfler et al.

(10) Patent No.: US 10,576,855 B2
(45) Date of Patent: Mar. 3, 2020

(54) MECHANISM FOR ADJUSTING CONTOUR OF SEAT AND SEAT WITH CONTOUR-ADJUSTING MECHANISM

(71) Applicant: Alfmeier Präzision SE, Treuchtlingen (DE)

(72) Inventors: Erich Dörfler, Landsberg (DE); Ronny Gehlmann, Allersberg (DE)

(73) Assignee: Alfmeier Präzision SE, Treuchtlingen (DE)

( * ) Notice: Subject to any disclaimer, the term of this patent is extended or adjusted under 35 U.S.C. 154(b) by 0 days.

(21) Appl. No.: 15/987,042

(22) Filed: May 23, 2018

(65) Prior Publication Data
US 2018/0339617 A1 Nov. 29, 2018

(30) Foreign Application Priority Data
May 24, 2017 (DE) .................. 10 2017 111 429

(51) Int. Cl.
*B60N 2/66* (2006.01)
*B60N 2/90* (2018.01)

(52) U.S. Cl.
CPC ............. *B60N 2/665* (2015.04); *B60N 2/914* (2018.02); *B60N 2/976* (2018.02); *B60N 2/99* (2018.02)

(58) Field of Classification Search
CPC .......... B60N 2/665; B60N 2/914; B60N 2/99; B60N 2/976
USPC ....................................... 297/284.6
See application file for complete search history.

(56) References Cited

U.S. PATENT DOCUMENTS

| 5,076,643 A * | 12/1991 | Colasanti | A47C 7/467 |
| | | | 297/284.6 |
| 2010/0244504 A1* | 9/2010 | Colja | A61H 9/0078 |
| | | | 297/180.1 |
| 2018/0370405 A1* | 12/2018 | Klein | B60N 2/665 |

FOREIGN PATENT DOCUMENTS

DE  4441366 C1  12/1995

OTHER PUBLICATIONS

German Office Action dated Jan. 24, 2018 with machine translation.

* cited by examiner

*Primary Examiner* — Milton Nelson, Jr.
(74) *Attorney, Agent, or Firm* — JK Intellectual Property Law, PA

(57) ABSTRACT

A mechanism for adjusting a contour of a seat, and a seat with a contour-adjusting mechanism, may include a selectively fillable air cushion and a support arrangement including a support element on which the air cushion is mounted.

13 Claims, 4 Drawing Sheets

//<br>
MECHANISM FOR ADJUSTING CONTOUR OF SEAT AND SEAT WITH CONTOUR-ADJUSTING MECHANISM

CROSS-REFERENCE TO RELATED APPLICATION

This application claims benefit to German Patent Application Number 102017111429.7, filed May 24, 2017, which is incorporated in its entirety by reference herein.

TECHNICAL FIELD

The disclosure refers to a mechanism for adjusting the contour of a seat, especially a car seat. Furthermore, the disclosure refers to a seat, especially a car seat, with such a mechanism.

BACKGROUND

In seats, especially in car seats, it is desirable not only to perform basic adjustments such as the inclination of the backrest or seat cushions or the seat height. Rather, the aim is to also design the seat contour or firmness of the upholstery in an adjustable way so the seat can be adapted to the anatomical conditions of the various seat users or to increase the seat comfort. To achieve this, it is typical to integrate an adjustable lumbar support into the backrest, for example. To enhance the well-being of a seat user and prevent a driver's tiredness and stress, for example, massaging systems integrated into the seat can also be used. Moreover, the side bolsters of the seat are often adjustable as well in order to adapt the backrest or seat cushion width to the body structure of the respective seat user to offer secure lateral support.

Such lumbar support or such massaging system or such side bolster adjustment is made possible by one or several bubbles or air cushions built into the seat that are generally made of an elastic material that can be filled with air or emptied or deflated. The inflating and deflating of the air cushions is typically accomplished with the help of valves and a pneumatic pump. The quantity of the air filling the air cushions affects their firmness or shape and therefore the seat's contour. As a result of this, the lumbar support and/or lateral support can be adapted to the individual seating needs of the respective user and then maintained while the seat is being used, which is the case while the car is being driven, for example. To execute a massaging function, the air cushions integrated into the seat are cyclically filled and deflated, thereby changing the contour of the seat selectively and dynamically.

In current massaging systems or lumbar supports or for adjusting the lateral support, the air cushions are integrated into the seat in such a way that they are placed directly on the structural elements of the seat structure; in the case of a massaging system or lumbar support, for example, on the seat cushion or backrest cushion, which are typically made of foam. In the side bolster, the air cushions rest, for example, directly on so-called supporting plates, integrated into the side bolsters of the seat as part of the seat structure. If one or several of the air cushions are filled, they sink into the seat cushion or backrest cushion while being inflated, since the foam does not offer enough counter support and the air cushion therefore expands uniformly in all directions. Consequently, the desired effect is not fully achieved. For example, a change in the seat's contour while the lumbar support is being adjusted is noticeable only after some time, as soon as the air cushion has already been partially filled with air and not already at the start of filling process. When the massaging function is being performed, a massaging effect is not sufficiently noticeable, for example. Faster reactions are also desirable when adjusting the side bolsters, even if in this case a sinking of the air cushion is already largely ruled out owing to the hardly existing cushioning or lack thereof.

Therefore, to compensate for this effect, larger air cushions or larger air supply units are used to achieve a sufficient massaging effect or to adjust the lumbar support or lateral support faster. However, larger air cushions in turn also mean a longer running time of the pump to fill them with the same pressure, thereby possibly reducing the operating life of the supply lines, valves and the pump itself. An overall larger air supply unit is also disadvantageous, as there is only little available space inside a seat, especially a car seat, and also the weight of the massaging system or lumbar support or side bolster adjustment should be maintained as low as possible.

SUMMARY

It is therefore the task of the disclosed subject matter to suggest a mechanism for adjusting the contour of a seat, especially of a car seat, as well as a seat, especially a car seat, to improve them with regard to the aforementioned disadvantages.

The task is solved by a mechanism having the characteristics according to present disclosure. The mechanism for adjusting the contour of a seat, especially of a car seat, encompasses at least one air cushion that can be integrated into the seat and can be filled with air and deflated to adjust the contour of the seat. Furthermore, the mechanism encompasses at least one support arrangement with at least one support element on which the at least one air cushion is arranged. The support arrangement or support element itself can be integrated or inserted into a cavity of the seat and/or can be placed on a structural element of the seat and is designed to prevent an expansion of the at least one air cushion in the direction of the support element when the air cushion is being filled and/or to bring the at least one cushion from a first to a second position.

Even without air cushions integrated into the seat, the latter has a defined surface shape or contour that would be primarily capable—even without further changes—to support the body of a seat user. However, in order to increase seating comfort, mechanisms to adjust the contour are integrated into the seat that include inflatable and deflatable air cushions. A mechanism for adjusting the contour is understood to be both a mechanism to adjust and/or move a lumbar support, i.e., the curvature of the seat adapted to the individual user or his spine, or to adjust and/or move a lateral support by changing the width of the side bolsters, and also a mechanism for executing a massaging function of the seat, i.e., a dynamic and cyclic contour adjustment or the dynamic and cyclic movement of the seat's curvature. Thus, the term contour of the seat must be understood as an outer shape or curvature of the seat, which depending on the filling degree of the air cushion or the filling degrees of the air cushions, i.e., on the air volumes trapped in the air cushions or inner pressures, can be individually adapted and adjusted and/or cyclically changed. By adjusting the lumbar support or lateral support or also making further adjustments that all together change the contour permanently or whereby an adjusted contour of the seat is maintained subsequently, differences among the bodies or preferences of the seat users should be compensated ("static contour adjustment"). Massaging systems are primarily characterized by the fact that the contour changes take place cyclically. Through internal pressure changes in the air cushions, such cyclical changes affect the pressure perception of the seat user, who perceives the cyclic changes as massage ("cyclic contour adjustment").

Therefore, the idea of the invention is based on the idea not to place the air cushion directly or right on the seating structure of the seat, especially on a seat cushion or integrate it into the seat in this fashion, but to allow for a supporting arrangement for the air cushion. Thus, the air cushion is placed on an additional element, namely a support element, which can be integrated into a seat cavity of the seat and/or placed on a structural element of the seat and/or fixed on the structural element. Therefore, on the one hand, the seat cavity can be executed as a recess in the seat's upholstery, for example in the seat's backrest or cushion, so that the support arrangement is embedded in the seat upholstery. On the other hand, the cavity can also extend all the way to the seat's structural elements through the seat's upholstery or be executed between a seat cover and structural elements, so that the support arrangement rests at least in part directly on the seat's structural elements or supports itself on the structural elements.

The mechanism supports an adjustment of the seat's contour, especially when adjusting a lumbar support or when a noticeable massaging effect is achieved. To do this, the support arrangement or support element must be designed in a way to prevent the air cushion from expanding towards the support element when being filled with air, so that the air cushion merely expands in one direction, specifically in a direction given by the support element. Thus, the support element forms a kind of counter-support or resistance for the air cushion. This results in the advantage that air cushions must merely produce a stroke in one direction, namely away from the support element, so that compared to an air cushion that constantly expands in all directions when being filled, smaller air volumes are sufficient to achieve a similar, noticeable massaging effect for example. Since the pressure inside the air cushion necessary for this (noticeable for the user) is reached sooner, a fast reaction time is achieved too. Furthermore, the total stress on the air supply unit is reduced as well, which in particular also includes a pneumatic pump connected to the air cushions via supply lines and valves arranged in the supply lines.

Especially while adjusting a lateral support, the support arrangement or support element serves to bring the at least one air cushion from a first position to a second position, whereby the movement from the first position to the second position takes place in a direction away from the support element, especially towards a seat user. In other words, the support mechanism is—alternatively or additionally to the function of preventing the air cushion to expand in the direction of the support element—designed to move the at least one air cushion to a position from which afterwards a massaging function or adjustment of the lumbar support or lateral support is started. Thus, the support arrangement allows a basic adjustment for a subsequent or later contour adjustment.

In short, it can be said that compared to conventional mechanisms in which the air cushion is placed directly on the seating structure of the seat, smaller or same-sized air cushions are sufficient to have significantly better and faster effects by using a support arrangement or a support element according to the present disclosure to achieve the same effect. If smaller air cushions are integrated into the seat, they can additionally be arranged closer beside one another, which in turn allows for a more precise adjustment of the seat's lumbar support, for example. Furthermore, the closer arrangement of the air cushions makes it possible to carry out new and especially more differentiated massaging functions such as waves or circles extending differently, for example, which in the current massaging systems can only be carried out very roughly due to the size of the air cushions and can thus be barely differentiated by a seat user.

In principle, the support arrangement or the support elements can be made as stable structural elements that comprise, for example, a wire frame or from a harder or more rigid material. However, since this would lead to a permanent worsening of seating comfort, in a preferred embodiment the support arrangement or support element is designed in such a way that it can be varied between an active position and a passive position, whereby the support element prevents an expansion of the at least one air cushion towards the support element in the active position. In other words: The support element prevents the expansion of the air cushion merely in an active position.

Alternatively or additionally, in a preferred embodiment the support arrangement or support element is designed in such a way that the at least one air cushion is in a passive position of the support element in the first position and in an intermediate and/or active position of the support element in the second position. Therefore, when the position of the support element is moved from the passive position to the intermediate and/or active position, the air cushion is thus moved from its first position to its second position. Here, an intermediate position is understood to be a position of the support element in which it has moved the air cushion at least into the second position. An expansion of the air cushion towards the support element is possibly but not necessarily prevented in the intermediate position; this is only the case in the active position.

To prepare a contour adjustment when, for example, a massaging function should be started, the support arrangement or support element is activated beforehand, i.e. moved or deformed from a passive position to an intermediate and/or active position. As a result of this, the at least one air cushion is first moved to the second position, especially in a direction away from the support element and closer to a back, seating or lateral surface facing the seat user, in order to achieve a generally faster effect when the air cushion is filled for a seat user (intermediate position). This effect can be additionally reinforced when an intermediate position of the support element already corresponds to the active position or when the support element subsequently changes from the intermediate position to the active position. By taking a passive position while no contour adjustment is being carried out or planned, a possible reduction of seating comfort by the support arrangement that occurs when the air cushion is not being filled or deflated can be prevented.

In the active position, the support arrangement or support element is executed preferably in a pressure and/or dimensionally stable way to reliably prevent an expansion of the at least one air cushion towards the support element. In the intermediate position, such pressure and/or dimensionally stable design of the support arrangement or support element is not absolutely necessary at first.

In an especially preferred design, the support element comprises at least one main body and a flexible, especially pressure-tight, cover that encloses or surrounds the main body at least in sections, whereby the main body and the cover enclose a space between them—at least in sections, especially in an area in which the at least one air cushion is placed on the support element—that can be filled with air to take the intermediate and/or active position and deflated to take the passive position. In other words: The support element forms, at least in sections, pneumatically closed chambers whose inner pressure is increased to take the intermediate and/or active position, and lowered to take the passive position by injecting compressed air to inflate with air a space available inside the cover not filled by the main body or to connect or link it to the ambient atmosphere for deflating it. Thus, the support element likewise forms a kind of bubble or air cushion that is a counter support for the air cushion or cushions. Advantageously, a pressure is adjusted in the active position in which the support element is dimensionally and pressure stable to almost fully prevent an expansion of the air cushion towards the support element during the contour adjustment or massage. This is especially accomplished by adjusting a pressure inside the support element that is larger than the maximum pressure achievable inside the air cushion.

Furthermore, in a preferred embodiment, the support element comprises stabilizing elements that ensure the maintenance of an external shape of the support element even when compressed air is injected, for instance in form of bars or internal connections of the flexible cover, according to the honeycomb principle, for example. The support element includes, for example, at least two main bodies arranged parallel to one another that are enclosed in each case, at least in sections, by a flexible cover that is preferably designed as one single piece, so that the internal connections of the cover can fulfill the stabilizing function. Thus, the support element is comparable, for example, to an air mattress having several chambers that can be filled in each case with air.

Preferably, the at least one support element, especially the one forming at least one main body of the support element from a material whose properties are similar to a seat material enclosing the cavity at least partially, i.e., to the seat structure or seat upholstery, has especially a comparable or corresponding pressure resistance and/or surface hardness. As a result of this, the seating comfort and the mechanical properties in the support element that is in the passive position are comparable to a non-modified seat, i.e., a seat user would not feel a difference to seats having no support arrangement or support element.

Preferably, the main body and/or the seat material (i.e., the seat upholstery) enclosing the cavity at least partially is made of a foam, especially of polyurethane foam.

The cover is preferably executed as film, whereby thermoplastic polyurethane is especially selected as material.

To provide the most compact mechanism possible and numerous functions, the mechanism in a preferred embodiment includes at least two air cushions arranged on a common support element and/or the mechanism comprises one support arrangement with at least two support elements, whereby in each case at least one, especially two air cushions are arranged on one of the at least two support elements.

For the injection of compressed air, the at least one air cushion and/or the at least one support element are respectively connected to a pneumatic pump via a supply line, whereby especially a common pneumatic pump is used. A control unit is provided to control the pneumatic pump and the valves arranged in the supply line. In order to change the pressure in the individual air cushions or the frequency of the compressed air injection when a massaging function is being carried out, the seat user is provided with operating elements that communicate with the control unit. The above-mentioned components, i.e., pneumatic pump, supply lines, valves, control unit and/or operating elements, can be integrated at least partially into the seat as part of the mechanism.

The task is additionally solved by a seat, especially a car seat, having the characteristics according to the present disclosure, with a mechanism for adjusting the contour of the seat, especially with a mechanism for adjusting the contour of the kind of seat described above. The seat has at least one air cushion inserted in or integrated into the seat that can be filled with air and/or deflated to adjust the contour of the seat. Furthermore, the seat has one support arrangement with at least one support element on which the at least one air cushion is arranged. The support arrangement or the support element itself is integrated into or inserted in a seat cavity or placed on a structural element of the seat and designed to prevent an expansion of the at least one air cushion towards the support element when the air cushion is filled and/or to bring the at least one air cushion from a first position to a second position.

Here, the at least one air cushion is especially integrated into a backrest and/or seat cushion and/or side bolster of the seat and/or the at least one support element of the support arrangement is arranged inside a cavity of the backrest and/or seat cushion and/or side bolster of the seat and/or placed on or fastened to a structural element of the backrest and/or seat cushion and/or side bolster.

The cavity of the seat can, in turn, be executed on the one hand as recess in the seat's upholstery, for example, a seat's backrest or seat cushion, so that the support arrangement is embedded in the seat's upholstery. On the other hand, the cavity can also be designed to extend through the seat's upholstery to the structural elements of the seat or between a seat cover and structural elements, so that the support arrangement rests at least partially directly on the structural elements of the seat or on the structural element.

In a preferred embodiment of the at least one air cushion is arranged on a side of the support element facing a seating surface and/or back surface, so that an expansion of the at least one air cushion in the opposite direction of the seating surface and/or back surface and/or the side bolster of the seat is prevented in the intermediate and/or active position. As a result of that, merely a stroke noticeable to the seat user or an expansion of the air cushion noticeable to the seat user is allowed or supported.

Preferably, the at least one support element extends in a longitudinal direction of the backrest and/or seat cushion and/or side bolster of the seat, whereby at least two air cushions are arranged successively in longitudinal direction on the at least one support element, and whereby the at least two air cushions are injected at different times with compressed air especially to execute a massaging function.

BRIEF DESCRIPTION OF THE DRAWINGS

The disclosed subject matter is described in more detail below, also with regard to additional characteristics and advantages, by means of embodiments and the reference to the enclosed drawings, which show in each case in a schematic diagram.

DETAILED DESCRIPTION

Figure 1:
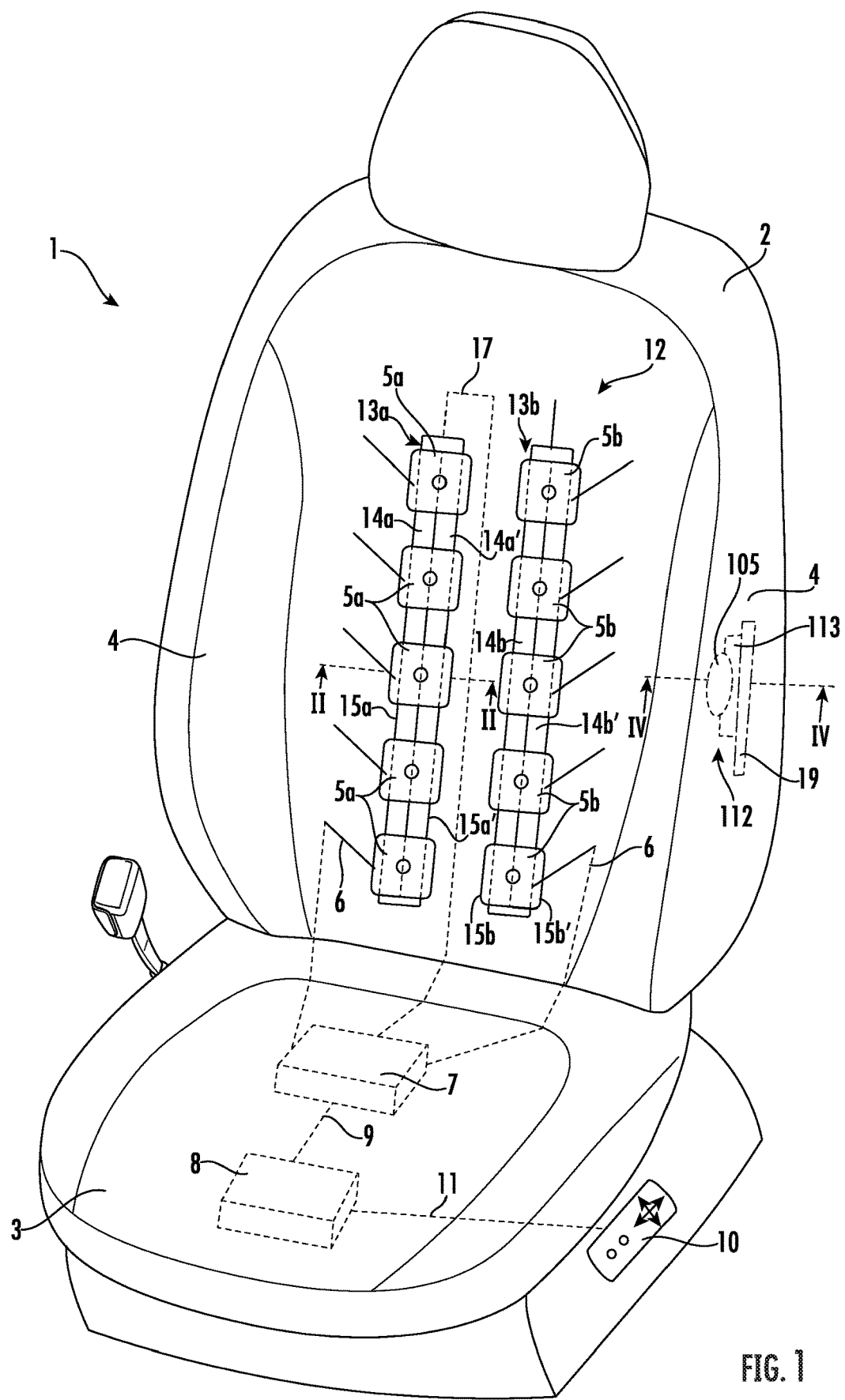
FIG. 1 is a schematic isometric view of a car seat with a mechanism for adjusting the contour of the car seat.

FIG. 1 shows a seat, more precisely a car seat 1 with a mechanism for adjusting the contour of the car seat 1. The car seat 1 comprises a backrest 2, a seat cushion 3 and side bolsters 4. The mechanism comprises several air cushions 5a, 5b, integrated into the car seat 1, exemplarily two groups of five air cushions 5a, 5b each that can be filled with air and deflated to change the contour of the car seat 1. To inflate the air cushions 5a, 5b, they are each connected to, or can be connected to, a pneumatic pump 7 through supply lines 6; to deflate the air cushions 5a, 5b, they are connected to, or can be connected to the ambient atmosphere (not shown). For clarity FIG. 1 shows only two supply lines 6 fully. In each of the supply lines 6, valves not shown have been arranged that open or close the supply lines 6 in order to connect the respective air cushion 5a, 5b to the pneumatic pump 7 or ambient atmosphere so the air cushion 5a, 5b can perform a massaging function by cyclically being inflated or deflated, or also to maintain the pressure inside the air cushions 5a, 5b as soon as a lumbar support has been adjusted for the seat user, for example. To control the valves (not shown) and the pneumatic pump 7, a control unit 8 is provided that is connected to the valves and the pneumatic pump 7 via an electrical line 9. To change the pressure in the individual air cushions 5a, 5b, operating elements 10 are available to the seat user that are, in turn, connected to the control unit 8 via an electrical line 11. The respective filling level of the air cushions 5a, 5b is determined, for example, with pressure sensors (not shown). The pneumatic pump 7, the control unit 8 as well as the supply lines 6 and the electrical lines 9, 11 are integrated into the car seat 1.

Furthermore, the mechanism includes support arrangements 12, 112, whereby the support arrangement 12 is integrated into the backrest 2 of the car seat 1 and the support arrangement 112 is integrated into the side bolster 4 of the car seat. In this case, the support arrangement 12 comprises two support elements 13a, 13b on which the air cushions 5a, 5b are arranged. Here, five air cushions 5a are arranged on a common support element 13a and five air cushions 5b on a common support element 13b. The support elements 13a, 13b are each integrated into a cavity of the car seat 1 and designed to prevent an expansion of the air cushions 5a, 5b towards the support element 13a, 13b. In addition, the support elements 13a, 13b can be designed to move the air cushions 5a, 5b from a first position to a second position, whereby in the second position, the air cushions 5a, 5b are closer to the back surface facing the seat user. Here, both the support elements 13a, 13b and the air cushions 5a, 5b are integrated into the backrest 2 of the car seat 1. The air cushions 5a, 5b are arranged on a side of the support elements 13a, 13b facing one of the back surfaces of the car seat 1, i.e., on a side of the support elements 13a, 13b facing the seat user.

In this case, the mechanism or support arrangement 12 forms a massaging system for performing a massaging function, i.e., the air cushions 5a, 5b are cyclically filled with air and once again deflated in succession. To accomplish this, the two support elements 13a, 13b additionally extend vertically in a longitudinal direction of the backrest 2 and thus to the right and left along the spine of a seat user when the car seat 1 is being used.

The support arrangement 112 is integrated into the side bolster 4 of the car seat 1—in FIG. 1 indicated merely with a dotted line for one of the two side bolsters 4—and lies on a structural element 19 of the car seat 1. The support arrangement 112 comprises a support element 113 on which an air cushion 105 is arranged, whereby the support element 113 is designed to bring the air cushion 105 from a first to a second position in order to achieve a basic adjustment for a subsequent massaging process, for example. According to FIG. 1, the air cushion 105 is in its second position and filled with air. According to FIG. 2, the support element 113 is in its intermediate position, i.e., the support element 113 has already moved the air cushion 105 to the second position, but is not preventing an expansion of the air cushion 105 towards the support element 113.

Figure 2A:
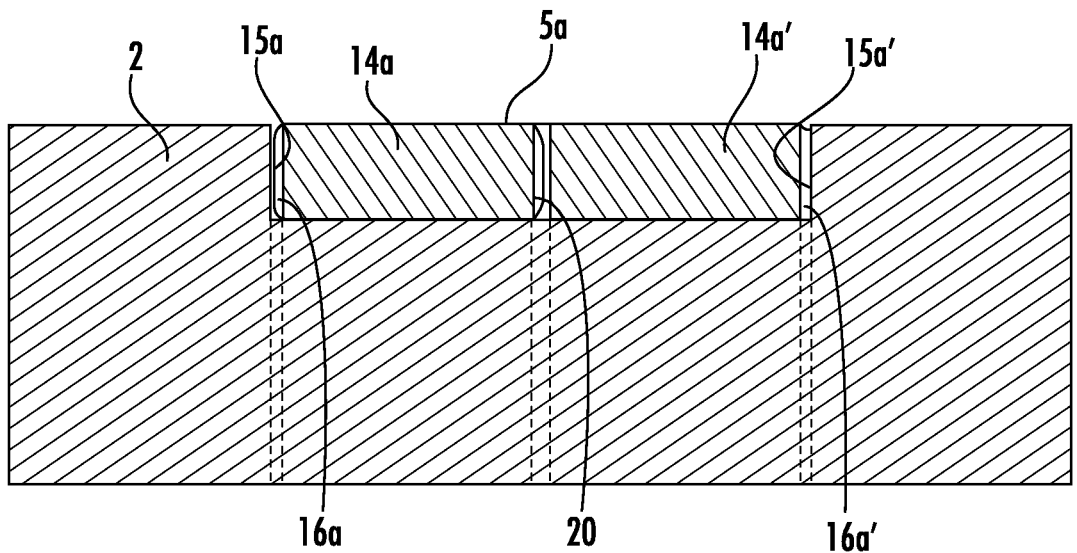
FIG. 2A is a partial sectional view of the car seat along line II-II of FIG. 1 with an air cushion in a deflated condition.
Figure 2B:
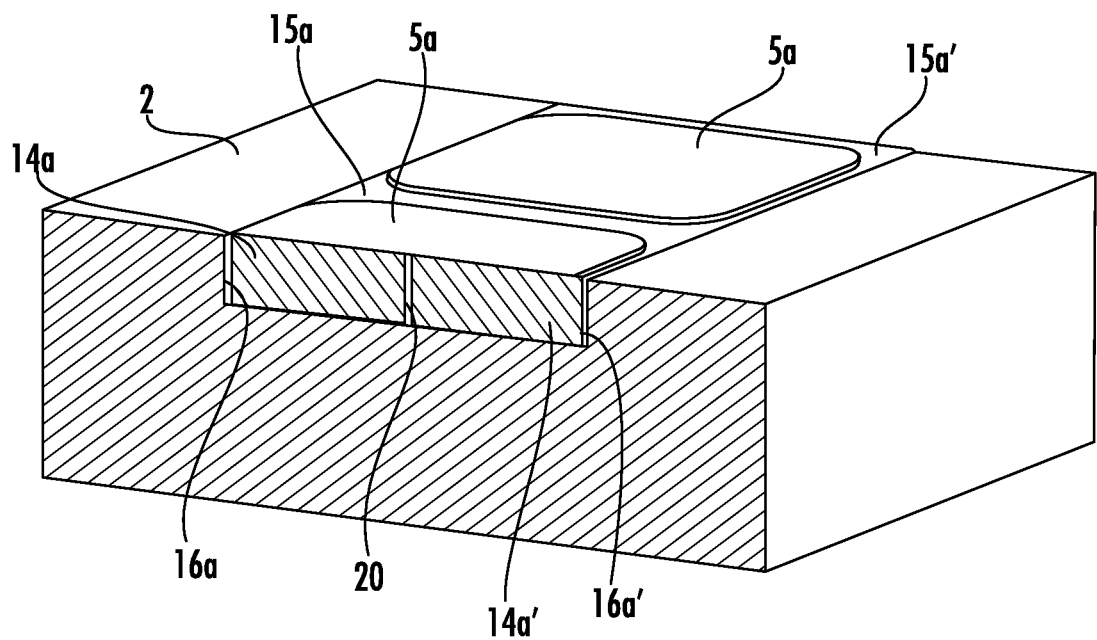
FIG. 2B is an isometric view of the area shown in FIG. 2A.
Figure 3A:
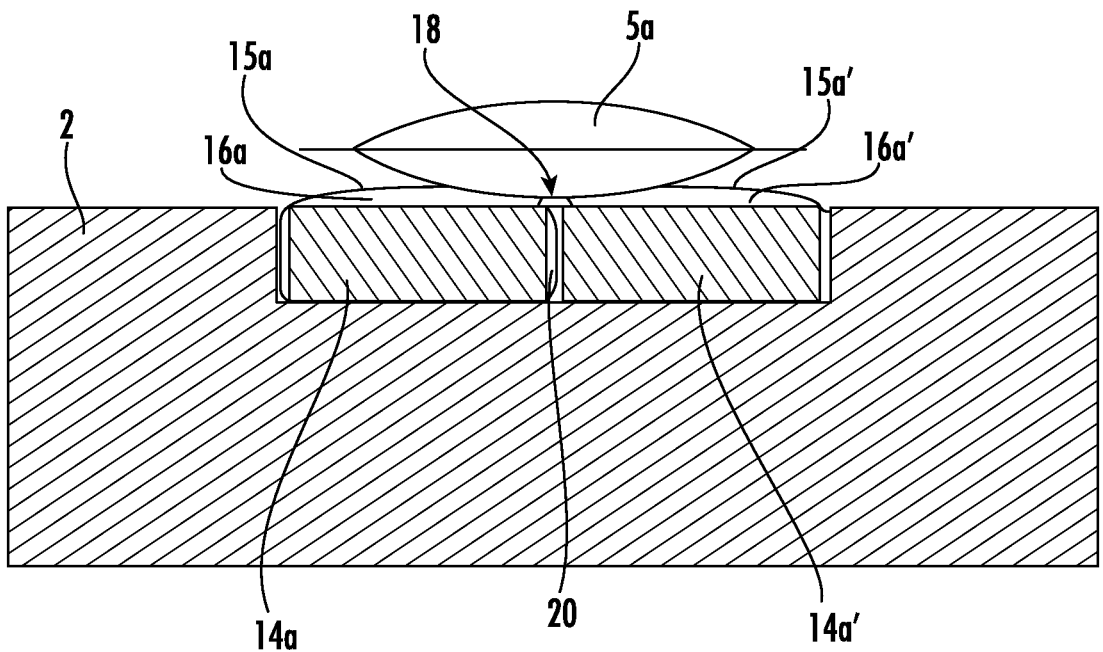
FIG. 3A is an partial sectional view as in FIG. 2A but with the air cushion filled with air.
Figure 3B:
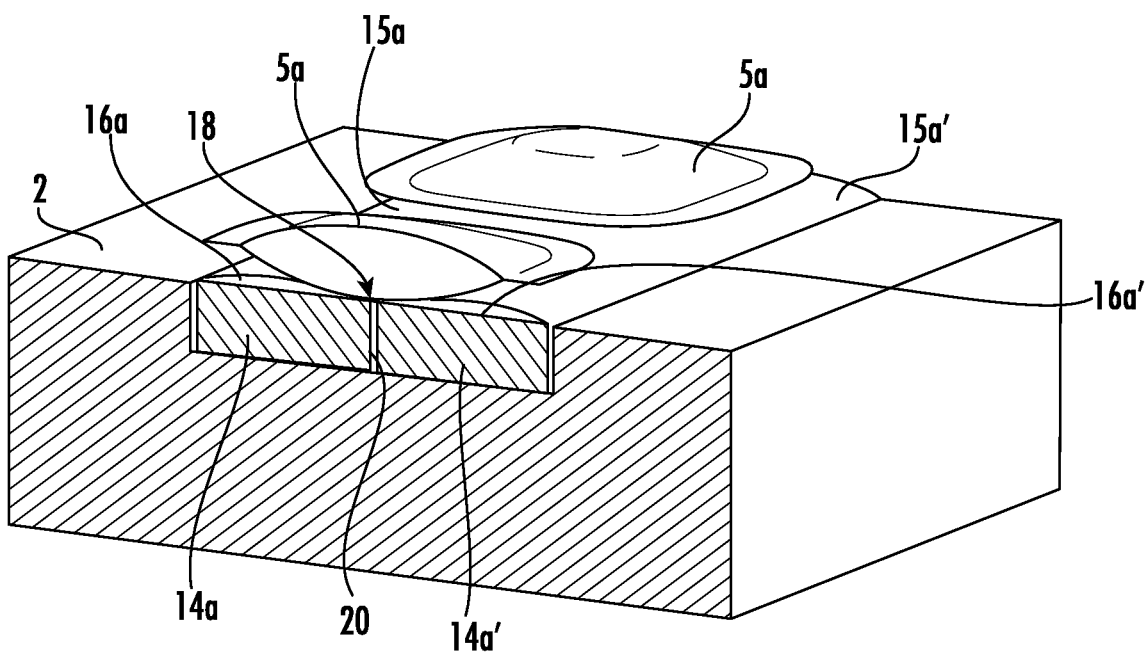
FIG. 3B is an isometric view of the area shown in FIG. 3A.

FIGS. 2A & 2B show a section through the support arrangement 12 integrated into the backrest 2 along the line II-II in a state in which the support element 13a is in a passive position and the air cushion 5a is fully deflated. FIGS. 3A & 3B likewise show a section through the support arrangement 12 integrated into the backrest 2 along the line II-II, whereby in this case the support element 13a is in an active position and the air cushion 5a is in a filled state. Here, the support element 13a is integrated into a cavity of the seat executed as recess in the seat upholstery of the backrest 2. Alternatively, the cavity in which the support element 13a is arranged could also extend through the seat upholstery all the way to the structural elements of the seat (not shown), so that the support element 13a is surrounded laterally by the seat upholstery of the backrest 2, but rests on the structural elements in order to fully bypass the flexibility of the seat upholstery. This is exemplarily indicated by the dotted line in FIG. 2A.

Here, the support element 13a comprises two elongated main bodies 14a, 14a' each enclosed by a flexible cover 15a, 15a'. The covers 15a, 15a' are designed as one piece or are part of a cover formed by two pneumatically closed chambers. A bar 20 formed by the two covers 15a, 15a' runs between the two main bodies 14a, 14a' and forms a stabilizing element that ensures the maintenance of an external shape of the support element 13a also when being injected with compressed air. The main body 14a, 14a' and the covers 15a, 15a' enclose in sections, namely at least in one area in which one air cushion 5a rests on the support element 13a or the main bodies 14a, 14a' and the flexible covers 15a, 15a', a space 16a, 16a' between them.

The support element 13a can be varied or deformed between an active position (FIG. 3A/3B) and a passive position (FIG. 2A/2B). To take the active position, the intermediate space 16a, 16a' can be filled with air. To do this, the support element 13a, more precisely the intermediate spaces 16a, 16a' that enclose the main bodies 14a, 14a' and the covers 15a, 15a' between them, is connected to the pneumatic pump 7 via a supply line 17. By opening a valve (not shown) arranged in the supply line 17, the support element 13a, more precisely the intermediate spaces 16a, 16a', can be filled with air and the support element 13a is thus brought to the active position, whereby the support element 13a takes a pressure and dimensionally stable form, thereby preventing an expansion of the air cushion 5a towards the support element 13a.

To take the passive position, the space 16a, 16a' is vented to the ambient atmosphere via lines (not shown). In order not to reduce seating comfort in the position (FIG. 2A/2B), the main bodies 14a, 14a' are made of the same material as the backrest 2 of the car seat 1. Thus, the main bodies 14a, 14a' or the support element 13a integrated into the cavity of the backrest 2 have similar properties, especially the same pressure resistance and surface hardness, so that the seat user cannot notice any difference compared to the backrest 2 that lacks the support arrangement 12. Here, both the main body 14a, 14a' and the material of the car seat 1 or of the backrest 2 are made of polyurethane foam. The cover 15a, 15a' enclosing the main body 14a, 14a' is a film made of thermoplastic polyurethane.

In the active position (FIG. 3A/3B), the support element 13a prevents the air cushion 5a from expanding towards the support element 13a and thus in this case in the direction of a side of the backrest 2 facing away from the user. The air cushion 5a does not penetrate the support element 13a but only expands in the opposite direction of the support element 13a, thereby improving the contour adjustment of the car seat 1. The air cushion 5a has been placed here on the center of the support element 13a or symmetrically on the main bodies 14a, 14a'. It is advantageous here that the air cushion 5a is arranged or "clamped" in a space 18 when the active support element 13a is active, which is formed between it when the covers 15a, 15a' are filled, thus additionally preventing a shifting of the air cushion 5a during the contour adjustment, in this case of the massage.

The preceding designs also apply analogously to the support element 13b, its main bodies 14b, 14b', the covers 15b, 15b' enclosing them and the air cushion 5b arranged on top, so that the preceding designs are referred to for this purpose.

Figure 4A:
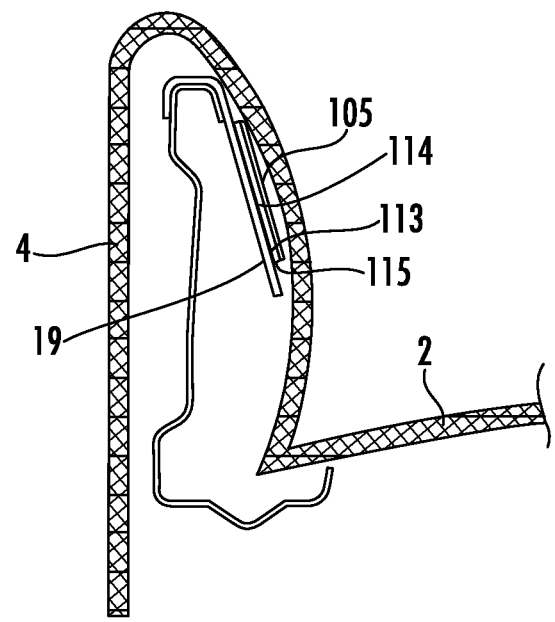
FIG. 4A is a partial sectional view of a side bolster of the car seat along line IV-IV of FIG. 1, with an air cushion in a deflated condition.
Figure 4B:
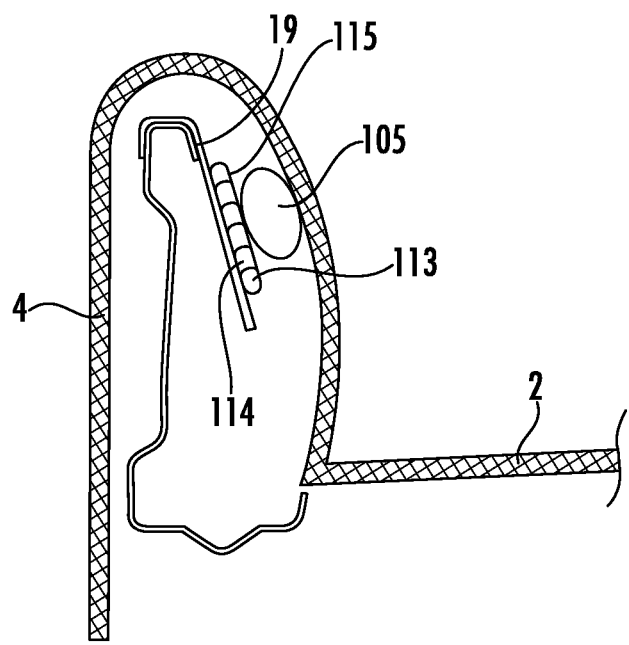
FIG. 4B is a partial sectional view of the area shown in FIG. 4A, but with the air cushion filled with air.

A section through the support arrangement 112 integrated into the side bolster 4 is shown in FIG. 4A along the line IV-IV in a state in which the support element 113 is in a passive position and the air cushion 105 is fully deflated. FIG. 4B also shows a section through the support arrangement 112 integrated into the side bolster 4 along the line IV-IV, whereby the support element 113 is here in an active position and the air cushion 105 in a filled state. The support element 113 encompasses here a main body 114 too, which is enclosed by a cover 115 at least in sections, whereby the main body 114 and cover 115 enclose a space between them that can be filled with compressed air and emptied, so that reference is made to the previous embodiments with regard to the support element 13a.

The support arrangement 112 or the support element 113 is placed directly on a structural element 19 of the car seat 1 and designed so the air cushion 105 can be brought from one first position (FIG. 4A) to a second position (FIG. 1, FIG. 4B) to perform the basic adjustment. According to FIG. 4A, the support element 113 is in its passive position. If the air cushion 105 is brought closer to the seat user, however, the support element 113 would have no dimensionally and pressure stable design to prevent an expansion of the air cushion 105 and the support element 113 is in an intermediate position. This results in a faster contour adjustment effect, but nonetheless allows an expansion of the air cushion 105 towards the support element 113 when it is being filled (FIG. 1). According to FIG. 4B, the support element 113 is in its active position, thus preventing an expansion of the air cushion 105 towards the support element 113 when it is being filled, whereby a further faster onset of the contour adjustment effect is achieved, especially the adjustment of the lateral support. According to FIG. 4B, the air cushion 105 is in its second position and filled with air.

While preferred embodiments of the invention have been described above, it is to be understood that any and all equivalent realizations of the present invention are included within the scope and spirit thereof. Thus, the embodiments depicted are presented by way of example only and are not intended as limitations upon the present invention. Thus, while particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

LIST OF REFERENCE CHARACTERS

1 Car seat
2 Backrest
3 Seat cushion
4 Side bolster
5a, 5b, 105 Air cushion
6 Supply line
7 Pneumatic pump
8 Control unit
9 Electrical line
10 Operating element
11 Electrical line
12, 112 Support arrangement
13a, 13b, 113 Support element
14a, 14a', 14b, 14b', 114 Main body
15a, 15a', 15b, 15b', 115 Cover
16a, 16a' Space
17 Supply line
18 Intermediate space
19 Structural element
20 Bar

We claim:
1. A mechanism for adjusting a contour of a seat for a car, the seat having a main body and a structural element, the seat defining a cavity therein, the mechanism comprising:
at least one air cushion locatable in the seat, the at least one air cushion configured to be selectively filled with air toward a filled state or deflated toward a deflated state for adjusting the contour of the seat; and
at least one support arrangement having at least one support element on which the at least one air cushion is mounted, the support element being at least one of locatable in the cavity defined in the seat and locatable on the structural element of the seat, the support element being configured to at least one of prevent an expansion of the at least one air cushion towards the support element when the air cushion is in the filled state and to bring the at least one air cushion from a first position to a second position, the at least one support element being movable between a passive position, an active position, and an intermediate position between the passive position and the active position, the support element when in the active position preventing an expansion of the at least one air cushion towards the support element, the at least one air cushion being in the first position when the support element is in the passive position, the at least one air cushion being in the second position when the support element is in one of the intermediate position and the active position.

2. The mechanism according to claim 1, including at least two of the support elements and at least two of the air cushions, at least one of the air cushions being mounted on each of the support elements.

3. The mechanism according to claim 1, wherein the at least one support element is at least one of pressure and dimensionally stable in the active position.

4. The mechanism according to claim 1, wherein the at least one support element includes at least one main body and a flexible cover enclosing the at least one main body at least in sections, wherein the main body and the cover enclose a space at least in sections between them that can be filled with air to take the active position and can be deflated to take the passive position.

5. The mechanism according to claim 4, wherein the cover is a film.

6. The mechanism according to claim 1, wherein the at least one support element includes stabilizing elements which ensure that the support element can maintain an external shape even when compressed air is injected.

7. The mechanism according to claim 1, wherein at least one of the main body and the cavity defined in the seat is made of foam.

8. The mechanism according to claim 1, wherein at least one of the at least one air cushion and the at least one support element are connected to a pneumatic pump for injection of compressed air via a supply line.

9. The mechanism according to claim 1, including at least two of the air cushions mounted on one common support element.

10. A seat for a car, with a mechanism for adjusting the contour of the seat according to claim 1, wherein the at least one air cushion is integrated into one of a backrest, a seat cushion and a side bolster of the seat.

11. The seat according to claim 10, wherein the cavity of the seat is located within one of the backrest, the seat cushion, the side bolster of the seat, and the at least one support element of the support arrangement is arranged inside the cavity and placed on the structural element.

12. The seat according to claim 10, wherein the at least one air cushion is arranged on a side of the support element facing at least one of a seating surface and a back surface.

13. The seat according to claim 10, wherein the at least one support element extends in a longitudinal direction in at least one of the backrest, seat cushion and side bolster of the seat, and wherein at least two of the air cushions are arranged successively in a longitudinal direction on the at least one support element, and wherein the at least two air cushions can be independently injected with compressed air.

* * * * *